United States Patent
Aoki

(10) Patent No.: US 10,173,475 B2
(45) Date of Patent: Jan. 8, 2019

(54) PNEUMATIC TIRE

(71) Applicant: BRIDGESTONE CORPORATION, Chuo-ku, Tokyo (JP)

(72) Inventor: Naotoshi Aoki, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 442 days.

(21) Appl. No.: 14/901,046

(22) PCT Filed: Jul. 3, 2014

(86) PCT No.: PCT/JP2014/003553
§ 371 (c)(1),
(2) Date: Dec. 27, 2015

(87) PCT Pub. No.: WO2015/004888
PCT Pub. Date: Jan. 15, 2015

(65) Prior Publication Data
US 2016/0185158 A1 Jun. 30, 2016

(30) Foreign Application Priority Data

Jul. 10, 2013 (JP) .............................. 2013-144435

(51) Int. Cl.
*B60C 11/12* (2006.01)
*B60C 11/04* (2006.01)
*B60C 11/03* (2006.01)

(52) U.S. Cl.
CPC ...... *B60C 11/0327* (2013.01); *B60C 11/0306* (2013.01); *B60C 11/1236* (2013.01);
(Continued)

(58) Field of Classification Search
CPC ......... B60C 11/0306; B60C 2011/0381; B60C 2011/0383; B60C 2011/1254
See application file for complete search history.

(56) References Cited

U.S. PATENT DOCUMENTS 5,012,847 A * 5/1991 Fukumoto ........... B60C 11/0306
152/209.18
5,211,781 A * 5/1993 Adam ................. B60C 11/0306
152/209.25
(Continued)

FOREIGN PATENT DOCUMENTS

CN 1812891 A 8/2006
CN 101027197 A 8/2007
(Continued)

OTHER PUBLICATIONS

Sep. 16, 2014, International Search Report issued in International Patent Application No. PCT/JP2014/003553.

*Primary Examiner* — Robert C Dye
(74) *Attorney, Agent, or Firm* — Kenja IP Law PC

(57) ABSTRACT

Each central land portion row (9) has at least one first narrow groove (21) that is open to the central main groove (5) and has a length a in a tire width direction and an angle α to the tire width direction, and at least one second narrow groove (23) has a length b in the tire width direction and an angle β to the tire width direction. Each outer land portion row (11) located on an outer side of a different one of the outer main grooves (7) in the tire width direction has at least one third narrow groove (25) that is open to the outer main groove (7) and has a length c in the tire width direction and an angle γ to the tire width direction. In the tire, a<b, and α<β<γ.

11 Claims, 2 Drawing Sheets

(52) U.S. Cl.
CPC . *B60C 2011/036* (2013.01); *B60C 2011/0334* (2013.01); *B60C 2011/0344* (2013.01); *B60C 2011/0365* (2013.01); *B60C 2011/0367* (2013.01); *B60C 2011/0372* (2013.01); *B60C 2011/0381* (2013.01); *B60C 2011/0383* (2013.01); *B60C 2011/0395* (2013.01); *B60C 2011/1209* (2013.01)

(56) References Cited

U.S. PATENT DOCUMENTS

| | | | | |
|---|---|---|---|---|
| 5,580,404 | A * | 12/1996 | Hitzky | B60C 11/0306 152/209.22 |
| 6,196,288 | B1 * | 3/2001 | Radulescu | B60C 11/0309 152/209.17 |
| 7,726,369 | B2 * | 6/2010 | Ito | B60C 11/0306 152/209.22 |
| 2007/0151646 | A1 * | 7/2007 | Ito | B60C 11/0306 152/209.25 |

FOREIGN PATENT DOCUMENTS

| | | |
|---|---|---|
| CN | 103097149 A | 5/2013 |
| JP | H05-178016 A | 7/1993 |
| JP | 2009-051453 A | 3/2009 |
| JP | 2013-078984 A | 5/2013 |

\* cited by examiner

PNEUMATIC TIRE

TECHNICAL FIELD

The disclosure relates to a pneumatic tire having improved dry performance while ensuring wet performance.

BACKGROUND

As a technique for improving braking performance and steering stability when a vehicle runs on a wet road surface (hereafter referred to as wet performance), the following method has been conventionally known: A plurality of main grooves extending in the tire circumferential direction are formed in the tread surface of the tire, and a plurality of width direction grooves, sipes, or the like extending in the tire width direction are formed in the land portions defined by these main grooves, thus enhancing the drainage performance of the tire on the wet road surface (for example, see Patent Literature (PTL) 1).

CITATION LIST

Patent Literature

PTL 1: JP 2009-51453 A

SUMMARY

Technical Problem

Forming many grooves or sipes in the land portions defined in the tread, however, causes a problem in that braking performance and steering stability on a dry road surface (hereafter referred to as dry performance) decrease due to a decrease in rigidity of the land portions.

It could therefore be helpful to provide a pneumatic tire having improved dry performance while ensuring wet performance.

Solution to Problem

The disclosed pneumatic tire is a pneumatic tire wherein four land portion rows are defined in a tread surface by one central main groove extending in a tire circumferential direction and outer main grooves extending in the tire circumferential direction on both sides of the central main groove, each central land portion row located between the central main groove and a different one of the outer main grooves has at least one first narrow groove that is open to the central main groove and has a length a in a tire width direction and an angle $\alpha$ to the tire width direction, and at least one second narrow groove that is open to the outer main groove and has a length b in the tire width direction and an angle $\beta$ to the tire width direction, each outer land portion row located on an outer side of a different one of the outer main grooves in the tire width direction has at least one third narrow groove that is open to the outer main groove and has a length c in the tire width direction and an angle $\gamma$ to the tire width direction, and the length a of the first narrow groove in the tire width direction, the length b of the second narrow groove in the tire width direction, the angle $\alpha$ of the first narrow groove to the tire width direction, the angle $\beta$ of the second narrow groove to the tire width direction, and the angle $\gamma$ of the third narrow groove to the tire width direction satisfy $a<b$ and $\alpha<\beta<\gamma$.

Advantageous Effect

It is thus possible to provide a pneumatic tire having improved dry performance while ensuring wet performance.

DETAILED DESCRIPTION

One of the embodiments is described below, with reference to drawings.

A tire 1 in this embodiment typically includes: a pair of bead portions; a pair of sidewall portions connected to the outer sides of the respective bead portions in the tire radial direction; and a tread portion extending between the sidewall portions, though not illustrated. A carcass extends toroidally throughout these portions between the respective bead cores buried in the bead portions, and a belt made up of a plurality of belt layers is placed on the outer side of the crown portion of the carcass in the tire radial direction.

Figure 1:
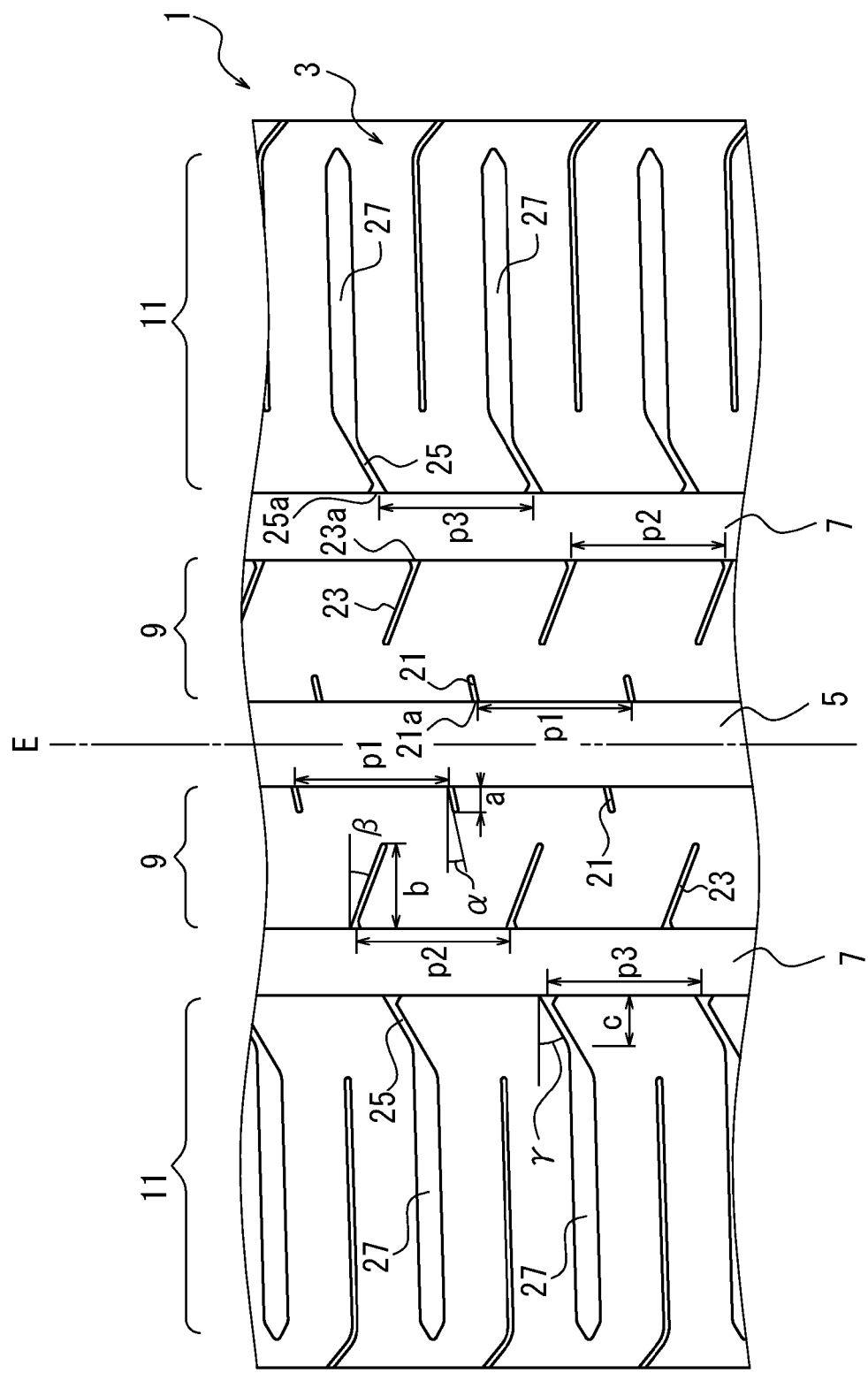
FIG. 1 is a partial development view illustrating a tread pattern of a pneumatic tire according to one of the embodiments.

FIG. 1 is a development view illustrating part of a tread portion 3 of a pneumatic tire (hereafter also referred to as a tire) 1 in one of the embodiments. In the tread portion 3, two central land portion rows 9 and two outer land portion rows 11 located on the outer sides of the respective central land portion rows 9 in the tire width direction are defined by one central main groove 5 continuously extending linearly along the tire circumferential direction on a tire equatorial plane E and two outer main grooves 7 continuously extending linearly along the tire circumferential direction on both sides of the central main groove 5. The central main groove 5 and the outer main grooves 7 need not necessarily extend linearly along the tire circumferential direction, and may extend in a zigzag or curved shape.

Each central land portion row 9 has at least one first narrow groove 21 that is open to the central main groove 5, and at least one second narrow groove 23 that is open to the outer main groove 7. In this example, a plurality of first narrow grooves 21 are arranged at regular intervals p1 in the tire circumferential direction, and a plurality of second narrow grooves 23 are arranged at regular intervals p2 in the tire circumferential direction, where p1 and p2 are equal. Each first narrow groove 21 and each second narrow groove 23 are staggered so as to differ in position from each other in the tire circumferential direction. The intervals between the narrow grooves in the tire circumferential direction need not necessarily be regular intervals, and may be any intervals. Each outer land portion row 11 has at least one third narrow groove 25 that is open to the outer main groove 7. In this example, a plurality of third narrow grooves 25 are arranged at regular intervals p3 in the tire circumferential direction as with the first narrow grooves 21 and the second narrow grooves 23, where p3 is equal to p1 or p2.

In the tire 1, the length a of the first narrow groove 21 in the tire width direction and the length b of the second narrow groove 23 in the tire width direction satisfy the relationship a<b, and the angle α of the first narrow groove 21 to the tire width direction, the angle β of the second narrow groove 23 to the tire width direction, and the angle γ of the third narrow groove 25 to the tire width direction satisfy the relationship α<β<γ, as illustrated.

The third narrow groove 25 connects to an extension groove 27 extending outward in the tire width direction at an angle different from that of the third narrow groove 25 in this example, though this is not a limitation. The length c of the third narrow groove 25 in the tire width direction is the length, measured along the tire width direction, of the narrow groove having the angle γ to the tire width direction. The same applies to the first narrow groove 21 and the second narrow groove 23. A narrow groove not open to the outer main groove 7 is formed between adjacent extension grooves 27, though such a narrow groove may be omitted as in an example illustrated in FIG. 2(c). The tread pattern of the tire 1 is point-symmetric with respect to a point on the tire equatorial plane E located at the center of the central main groove 5 in this example. However, this is not a limitation, and, for example, the tread pattern may be line-symmetric with respect to the tire equatorial plane, or either half of the line-symmetric shape may be displaced in the tire circumferential direction. Hence, better wet performance can be achieved by using the tire with appropriate rotation direction.

When the vehicle equipped with the tire 1 runs on a wet road surface, water between the tread surface and the road surface is absorbed by the first narrow groove 21, second narrow groove 23, and third narrow groove 25 in the land portion rows, and drained efficiently through the central main groove 5 and outer main grooves 7 with which the narrow grooves communicate. Moreover, the water film removal effect by the narrow grooves ensures steering stability and braking performance (wet performance). A hydroplaning phenomenon can also be suppressed by ensuring drainage performance.

The smaller angle of the first narrow groove 21 to the tire width direction increases the ground contact pressure (hereafter also referred to as edge pressure) of the land portion edge adjacent to the groove, and enhances the effect of removing any water film between the tread surface and the road surface around the narrow groove. Accordingly, a decrease in drainage performance is prevented even when the first narrow groove 21 is shorter in the tire width direction. Meanwhile, the second narrow groove 23 which is longer in the tire width direction delivers high drainage performance.

In the example illustrated in FIG. 1, each central land portion row 9 is a rib-shaped land portion continuous in the tire circumferential direction, which resists deformation and has high rigidity as compared with block-shaped land portions of a land portion row divided by, for example, narrow grooves extending in the tire width direction. Moreover, the staggered arrangement of the first narrow groove 21 and the second narrow groove 23, in addition to the smaller length a of the first narrow groove 21 in the tire width direction and the smaller angle α of the first narrow groove 21 to the tire width direction, increases the rigidity of the central land portion row 9 and further improves dry performance.

When the vehicle equipped with the tire 1 runs on a dry road surface, each central land portion row 9 having high rigidity contributes to high steering stability and braking performance. Moreover, the larger angle of the third narrow groove 25 to the tire width direction moderately lowers the rigidity of each outer land portion row 11, and increases the footprint area of the outer land portion row 11 during braking. This further improves braking performance.

In the disclosed pneumatic tire, the length a of the first narrow groove 21 in the tire width direction, the length b of the second narrow groove 23 in the tire width direction, and the length c of the third narrow groove 25 in the tire width direction preferably satisfy a<c<b. Thus, by appropriate narrow groove arrangement, the effect of improving dry performance can be further enhanced while ensuring wet performance.

In the disclosed pneumatic tire, preferably, the depth of the first narrow groove 21 is 50% to 100% of the depth of the central main groove, and the depth of each of the second narrow groove and the third narrow groove is 50% to 100% of the depth of the outer main groove. By setting such groove depths, sufficient groove volumes are secured to achieve high drainage performance and thus ensure sufficient wet performance, and also a decrease in rigidity of each land portion is prevented to improve dry performance more reliably. If the depth of the first narrow groove 21 is less than 50% of the depth of the central main groove or the depth of the second narrow groove or third narrow groove is less than 50% of the outer main groove, sufficient wet performance may not be ensured due to insufficient drainage performance. If the depth of the first narrow groove 21 is more than 100% of the depth of the central main groove or the depth of the second narrow groove or third narrow groove is more than 100% of the depth of the outer main groove, the effect of improving dry performance may be insufficient due to a decrease in rigidity of the land portion.

In the disclosed pneumatic tire, the length a of the first narrow groove 21 in the tire width direction is preferably 5% to 30% of the width of the central land portion row 9 in the tire width direction. With this structure, the drainage performance of the first narrow groove 21 is appropriately ensured to ensure sufficient wet performance, and also a decrease in rigidity of the central land portion row 9 is prevented to improve dry performance more reliably. If the length a of the first narrow groove 21 in the tire width direction is less than 5% of the width of the central land portion row 9 in the tire width direction, sufficient wet performance may not be ensured due to insufficient drainage performance. If the length a of the first narrow groove 21 in the tire width direction is more than 30% of the width of the central land portion row 9 in the tire width direction, the effect of improving dry performance may be insufficient due to a decrease in rigidity of the central land portion row 9.

In the disclosed pneumatic tire, the angle α of the first narrow groove 21 to the tire width direction is preferably 15° or less. With this structure, drainage performance is ensured to ensure sufficient wet performance. If the angle α is more than 15°, sufficient wet performance may not be ensured due to a decrease in water film removal effect caused by lower edge pressure.

In the disclosed pneumatic tire, the length b of the second narrow groove 23 in the tire width direction is preferably 30% to 90% of the width of the central land portion row 9 in the tire width direction. With this structure, the drainage performance of the second narrow groove 23 is appropriately ensured to ensure sufficient wet performance, and also a decrease in rigidity of the central land portion row 9 is prevented to improve dry performance more reliably. If the length b of the second narrow groove 23 in the tire width direction is less than 30% of the width of the central land portion row 9 in the tire width direction, sufficient wet performance may not be ensured due to insufficient drainage performance. If the length b of the second narrow groove 23 in the tire width direction is more than 90% of the width of the central land portion row 9 in the tire width direction, the effect of improving dry performance may be insufficient due to a decrease in rigidity of the central land portion row 9.

In the disclosed pneumatic tire, the angle β of the second narrow groove 23 to the tire width direction is preferably 15° to 30°. With this structure, the drainage performance of the second narrow groove 23 is appropriately ensured to ensure sufficient wet performance, and also a decrease in rigidity of the central land portion row 9 is prevented to improve dry performance more reliably. If the angle β is less than 15°, the effect of improving braking performance on a dry road surface may be insufficient. If the angle β is more than 30°, the effect of improving steering stability on a dry road surface may be insufficient due to a decrease in rigidity of the central land portion row 9.

In the disclosed pneumatic tire, the length c of the third narrow groove 25 in the tire width direction is preferably 5% to 30% of the width of the outer land portion row 11 in the tire width direction. With this structure, the drainage performance of the third narrow groove is appropriately ensured to ensure sufficient wet performance, and also a decrease in rigidity of the outer land portion row 11 is prevented to improve dry performance more reliably. If the length c of the third narrow groove 25 in the tire width direction is less than 5% of the width of the outer land portion row 11 in the tire width direction, sufficient wet performance may not be ensured due to insufficient drainage performance. If the length c of the third narrow groove 25 in the tire width direction is more than 30% of the width of the outer land portion row 11 in the tire width direction, the effect of improving dry performance may be insufficient due to a decrease in rigidity of the outer land portion row 11.

In the disclosed pneumatic tire, the angle γ of the third narrow groove 25 to the tire width direction is preferably 30° to 50°. With this structure, the drainage performance of the third narrow groove is appropriately ensured to ensure sufficient wet performance, and also a decrease in rigidity of the outer land portion row 11 is prevented to improve dry performance more reliably. If the angle γ of the third narrow groove 25 to the tire width direction is less than 30°, the effect of improving braking performance on a dry road surface may be insufficient. If the angle γ is more than 50°, the effect of improving steering stability on a dry road surface may be insufficient due to a decrease in rigidity of the outer land portion row 11.

In the disclosed pneumatic tire, the groove width of each of the first narrow groove 21, second narrow groove 23, and third narrow groove 25 is preferably 0.2 mm to 3.0 mm. With this structure, the volume of each narrow groove is secured to enhance drainage performance and thus ensure sufficient wet performance, and also the volume of each land portion is appropriately secured to enhance its rigidity and thus improve dry performance. If the groove width of each of the first narrow groove 21, second narrow groove 23, and third narrow groove 25 is less than 0.2 mm, sufficient wet performance may not be ensured due to insufficient drainage performance. If the groove width of each of the first narrow groove 21, second narrow groove 23, and third narrow groove 25 is more than 3.0 mm, the effect of improving dry performance may be insufficient due to a decrease in rigidity of the land portion row.

In the disclosed pneumatic tire, the directions in which the first narrow groove 21, the second narrow groove 23, and the third narrow groove 25 in the tread half on the same side of the central main groove 5 in the tire width direction are inclined with respect to the tire width direction, as seen from their openings 21a, 23a, and 25a to the central main groove 5 and the outer main groove 7, are preferably the same. With this structure, water between the tread surface and the road surface absorbed by each narrow groove is drained into the central main groove 5 or the outer main groove 7 in the same direction. Such efficient water drainage ensures wet performance.

EXAMPLES

The following describes the experimental production and performance evaluation of tires according to the disclosure. All tires of Comparative Examples 1 to 4 and Examples 1 to 3 have a tire size of 195/65R15 91H. Comparative Example 1 has a tread pattern illustrated in FIG. 2(a). Comparative Example 2 has a tread pattern illustrated in FIG. 2(b). Comparative Examples 3 and 4 and Examples 1 to 3 have a tread pattern illustrated in FIG. 2(c). The tires of Comparative Examples 1 to 4 and Examples 1 to 3 have the same structure except their tread patterns.

Figure 2:
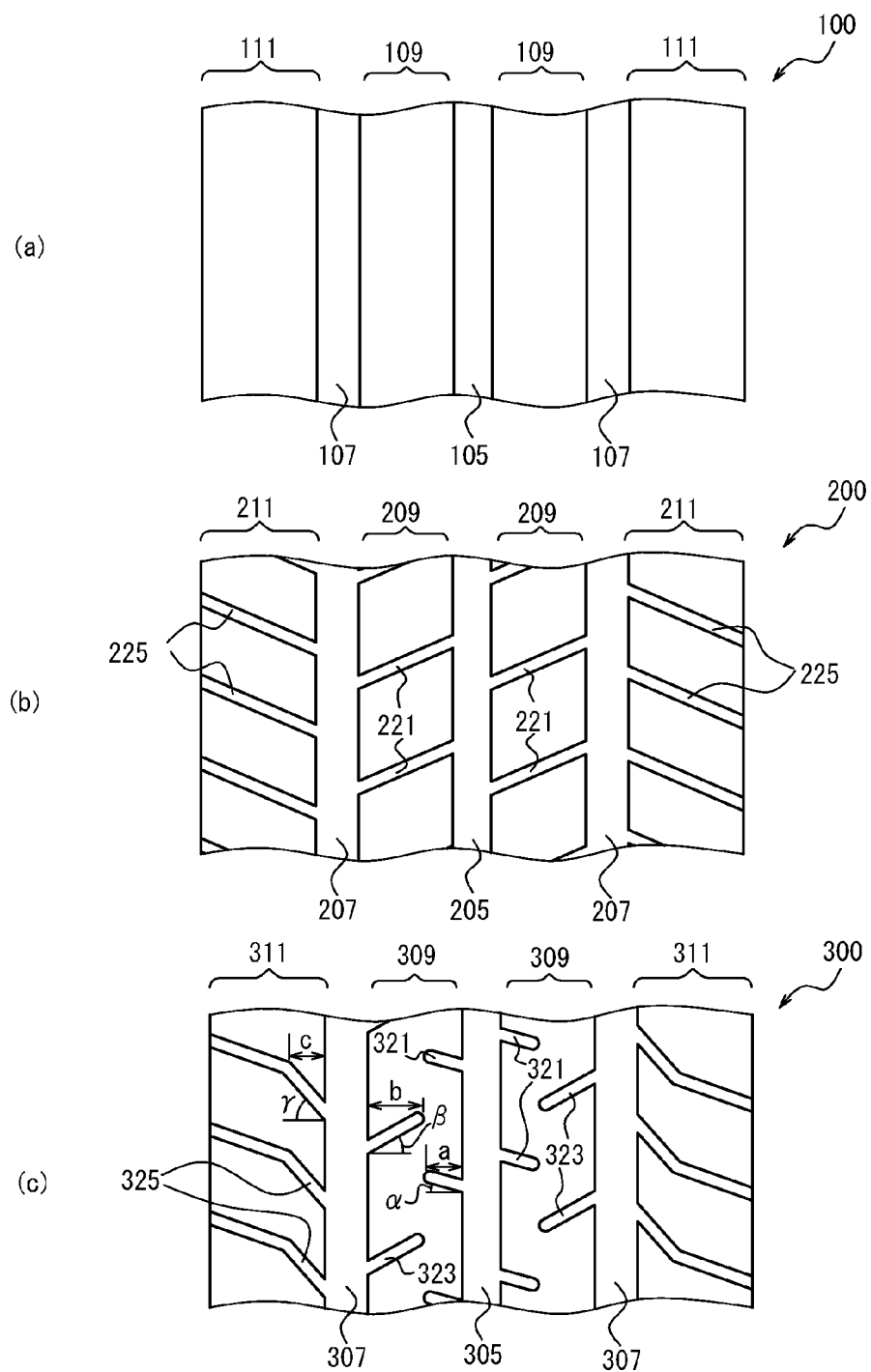
FIG. 2(a) is a partial development view illustrating a tread pattern of a pneumatic tire of a comparative example, (b) is a partial development view illustrating a tread pattern of a pneumatic tire of another comparative example, and (c) is a partial development view illustrating a tread pattern of a pneumatic tire of an example.

In a tire 100 of Comparative Example 1 having the tread pattern illustrated in FIG. 2(a), two central land portion rows 109 and two outer land portion rows 111 are defined by a central main groove 105 and outer main grooves 107 continuously extending along the entire circumference of the tire. Narrow grooves and the like are not formed in the central land portion rows 109 and the outer land portion rows 111.

In a tire 200 of Comparative Example 2 having the tread pattern illustrated in FIG. 2(b), two central land portion rows 209 and two outer land portion rows 211 are defined by a central main groove 205 and outer main grooves 207 continuously extending along the entire circumference of the tire. Each central land portion row 209 is separated into a plurality of block-shaped land portions arranged in the tire circumferential direction, by narrow grooves 221 crossing the central land portion row 209. Each outer land portion row 211 is separated into a plurality of block-shaped land portions arranged in the tire circumferential direction, by narrow grooves 225 crossing the outer land portion row 211.

In a tire 300 having the tread pattern illustrated in FIG. 2(c), two central land portion rows 309 and two outer land portion rows 311 are defined by a central main groove 305 and outer main grooves 307 continuously extending along the entire circumference of the tire. First narrow grooves 321 and second narrow grooves 323 are staggered in the tire circumferential direction in each central land portion row 309, and third narrow grooves 325 are formed in each outer land portion row 311. As in the foregoing embodiment, let a be the length of the first narrow groove 321 in the tire width direction, b be the length of the second narrow groove 323 in the tire width direction, c be the length of the third narrow groove 325 in the tire width direction, α be the angle of the first narrow groove 321 to the tire width direction, β be the angle of the second narrow groove 323 to the tire width direction, and γ be the angle of the third narrow groove 325 to the tire width direction. The values are shown in Table 1. Each of the values of a, b, and c is represented by an absolute value (mm) and a proportion (%) to the width of the land portion row.

<Anti-Hydroplaning Performance>

The hydroplaning critical speed when running straight on a wet road surface with a water depth of 10 mm was evaluated for each of the vehicles equipped with the respective tires. The evaluation results are expressed as indices with the result of Comparative Example 1 being 100, where a larger value denotes better anti-hydroplaning performance. The results are shown in Table 1.

<Wet Steering Stability>

The wet steering stability was evaluated for each of the vehicles equipped with the respective tires, by a professional test driver's comprehensive subjective evaluation on performance for straight running and performance for cornering when running a test course on a wet road surface in various running modes. The evaluation results are expressed as indices with the result of Comparative Example 1 being 3, where a larger value denotes better wet steering stability. The results are shown in Table 1.

<Wet Braking Performance>

The inverse of the stopping distance (mm) upon full braking after running on a wet road surface at an initial speed of 100 km/h was evaluated as an index for each of the vehicles equipped with the respective tires. The evaluation results are expressed as indices with the result of Comparative Example 1 being 100, where a larger value denotes better wet braking performance. The results are shown in Table 1.

<Dry Steering Stability>

The dry steering stability was evaluated for each of the vehicles equipped with the respective tires, by a professional test driver's comprehensive subjective evaluation on performance for straight running and performance for cornering when running a test course on a dry road surface in various running modes. The evaluation results are expressed as indices with the result of Comparative Example 1 being 3, where a larger value denotes better dry steering stability. The results are shown in Table 1.

<Dry Braking Performance>

The inverse of the stopping distance (mm) upon full braking after running on a dry road surface at 100 km/h was evaluated as an index for each of the vehicles equipped with the respective tires. The evaluation results are expressed as indices with the result of Comparative Example 1 being 100, where a larger value denotes better dry braking performance. The results are shown in Table 1.

Example 2 which provides an improvement in wet performance over the tire of Comparative Example 1.

INDUSTRIAL APPLICABILITY

It is thus possible to provide a pneumatic tire having improved dry performance while ensuring wet performance.

REFERENCE SIGNS LIST 1 pneumatic tire
3 tread portion
5 central main groove
7 outer main groove
9 central land portion row
11 outer land portion row
21 first narrow groove
21a opening of first narrow groove to central main groove
23 second narrow groove
23a opening of second narrow groove to outer main groove
25 third narrow groove
25a opening of third narrow groove to outer main groove

The invention claimed is:

1. A pneumatic tire,
wherein four land portion rows are defined in a tread surface by one central main groove extending in a tire circumferential direction and outer main grooves extending in the tire circumferential direction on both sides of the central main groove,
each central land portion row located between the central main groove and a different one of the outer main grooves has at least one first narrow groove that is open to the central main groove and has a length a in a tire width direction and an angle $\alpha$ to the tire width direction, and at least one second narrow groove that is open to the outer main groove and has a length b in the tire width direction and an angle $\beta$ to the tire width direction,

TABLE 1

|  | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|
| Corresponding drawing | FIG. 2(a) | FIG. 2(b) | FIG. 2(c) | FIG. 2(c) | FIG. 2(c) | FIG. 2(c) | FIG. 2(c) |
| Relationship of a, b, and c | — | — | $b < c < a$ | $a < c < b$ | $a < c < b$ | $a < b < c$ | $c < a < b$ |
| Relationship of $\alpha$, $\beta$, and $\gamma$ | — | — | $\alpha < \beta < \gamma$ | $\gamma < \beta < \alpha$ | $\alpha < \beta < \gamma$ | $\alpha < \beta < \gamma$ | $\alpha < \beta < \gamma$ |
| a [mm (%)] | — | — | 8 (40) | 3 (15) | 3 (15) | 3 (15) | 5 (25) |
| b [mm (%)] | — | — | 3 (15) | 8 (40) | 8 (40) | 5 (25) | 8 (40) |
| c [mm (%)] | — | — | 5 (20) | 5 (20) | 5 (20) | 8 (32) | 3 (12) |
| $\alpha$ [°] | — | — | 10 | 20 | 10 | 10 | 10 |
| $\beta$ [°] | — | — | 15 | 15 | 15 | 15 | 15 |
| $\gamma$ [°] | — | — | 20 | 10 | 20 | 20 | 20 |
| Anti-hydroplaning performance | 100 | 110 | 110 | 105 | 110 | 110 | 110 |
| Wet steering stability | 3 | 3.25 | 3.25 | 3 | 3.25 | 3.25 | 3.25 |
| Wet braking performance | 100 | 105 | 105 | 102 | 105 | 105 | 105 |
| Dry steering stability | 3 | 2.5 | 2.75 | 2.75 | 3 | 2.75 | 2.75 |
| Dry braking performance | 100 | 95 | 97 | 97 | 103 | 98 | 98 |

The test results in Table 1 demonstrate that the tires of the examples have improved dry performance while ensuring wet performance, as compared with the tire of Comparative each outer land portion row located on an outer side of a different one of the outer main grooves in the tire width direction has at least one third narrow groove that is open to the outer main groove and has a length c in the tire width direction and an angle γ to the tire width direction, the length a of the at least one first narrow groove in the tire width direction, the length b of the at least one second narrow groove in the tire width direction, the angle α of the at least one first narrow groove to the tire width direction, the angle β of the at least one second narrow groove to the tire width direction, and the angle γ of the at least one third narrow groove to the tire width direction satisfy a<b and α<β<γ, and respective directions in which the at least one first narrow groove, the at least one second narrow groove, and the at least one third narrow groove on a same side of the central main groove in the tire width direction are inclined with respect to the tire width direction, as seen from openings thereof to the central main groove and the outer main groove, are the same.

2. The pneumatic tire according to claim 1,
wherein the length a of the at least one first narrow groove in the tire width direction, the length b of the at least one second narrow groove in the tire width direction, and the length c of the at least one third narrow groove in the tire width direction satisfy
a<c<b.

3. The pneumatic tire according to claim 1,
wherein the at least one first narrow groove and the at least one second narrow groove are staggered in the tire circumferential direction in the central land portion rows.

4. The pneumatic tire according to claim 1,
wherein a depth of the at least one first narrow groove is 50% to 100% of a depth of the central main groove, and a depth of each of the at least one second narrow groove and the at least one third narrow groove is 50% to 100% of a depth of the outer main grooves.

5. The pneumatic tire according to claim 1,
wherein the length a of the at least one first narrow groove in the tire width direction is 5% to 30% of a width of the central land portion rows in the tire width direction.

6. The pneumatic tire according to claim 1,
wherein the angle α of the at least one first narrow groove to the tire width direction is 15° or less.

7. The pneumatic tire according to claim 1,
wherein the length b of the at least one second narrow groove in the tire width direction is 30% to 90% of a width of the central land portion rows in the tire width direction.

8. The pneumatic tire according to claim 1,
wherein the angle β of the at least one second narrow groove to the tire width direction is 15° to 30°.

9. The pneumatic tire according to claim 1,
wherein the length c of the at least one third narrow groove in the tire width direction is 5% to 30% of a width of the outer land portion rows in the tire width direction.

10. The pneumatic tire according to claim 1,
wherein the angle γ of the at least one third narrow groove to the tire width direction is 30° to 50°.

11. The pneumatic tire according to claim 1,
wherein a groove width of each of the at least one first narrow groove, the at least one second narrow groove, and the at least one third narrow groove is 0.2 mm to 3.0 mm.

* * * * *